United States Patent [19]

Takahashi et al.

[11] Patent Number: 5,274,023

[45] Date of Patent: Dec. 28, 1993

[54] THERMOPLASTIC POLYURETHANE RESIN

[75] Inventors: Hoyo Takahashi, Izumiotsu; Takuji Hirose, Osaka; Kunitoshi Ishihara, Izumiotsu, all of Japan

[73] Assignee: Dainippon Ink and Chemicals, Inc., Tokyo, Japan

[21] Appl. No.: 429,431

[22] Filed: Oct. 31, 1989

[30] Foreign Application Priority Data

Oct. 31, 1988 [JP] Japan ................. 63-273151

[51] Int. Cl.⁵ ................................ C08K 7/14
[52] U.S. Cl. .................. 524/425; 524/427; 524/507; 525/66; 525/130; 525/131
[58] Field of Search ............ 525/66, 131, 130; 524/425, 427, 507

[56] References Cited

U.S. PATENT DOCUMENTS

| | | | |
|---|---|---|---|
| 3,969,313 | 7/1976 | Aishima et al. | 524/427 |
| 3,970,716 | 7/1976 | Evers et al. | 524/507 |
| 4,089,911 | 5/1978 | Itoh et al. | 524/507 |
| 4,151,153 | 4/1979 | Ashcroft et al. | 524/425 |
| 4,206,102 | 6/1980 | Britain et al. | 524/507 |
| 4,318,959 | 3/1982 | Evans et al. | 428/364 |
| 4,412,025 | 10/1983 | Corwin et al. | 524/241 |
| 4,423,185 | 12/1983 | Matsumoto et al. | 525/66 |
| 4,735,985 | 4/1988 | Oien | 524/315 |
| 4,883,837 | 11/1989 | Zabrocki | 525/66 |

*Primary Examiner*—Paul R. Michl
*Assistant Examiner*—Edward J. Cain
*Attorney, Agent, or Firm*—Armstrong, Westerman, Hattori, McLeland & Naughton

[57] ABSTRACT

Disclosed is a thermoplastic polyurethane resin composition which contains a thermoplastic polyurethane resin (A) and a modified polyolefin resin (B) as its components. The polyurethane resin shows excellent flexibility, smooth touch, and stretching property when molded in the form of films or sheets. It is quite suitable for excretion-treating materials such as a diaper.

4 Claims, No Drawings

THERMOPLASTIC POLYURETHANE RESIN

BACKGROUND OF THE INVENTION

This invention relates to a thermoplastic polyurethane resin composition, especially to an elastic polyurethane resin composition which gives excellent smooth touch when used in the form of a film or sheet.

The elastic films, which have been so far applied to an excretion-treating material such as a paper diaper, have usually been composed of single resin of SBR (styrenebutadiene rubber), the mixed resin of SBR and thermoplastic polyurethane resin, or single resin of thermoplastic polyurethane. In addition to those resins, acid amide-type lubricants are blended in order to prevent a tacky adhesion.

However, those films almost lack pliability (high low-modulus), and stretching properly. Especially, when applied to the paper diaper for the children, the body is strongly by bound with those films. Accordingly, various means such as changing the construction of film blades or films are made to cover up the above-cited defects. Therefore, it has been desired to obtain fully satisfactory elastic films especially applied to the excretion-treating materials.

SUMMARY OF THE INVENTION

The primary object of the present invention is to provide a thermoplastic polyurethane resin composition having flexibility and low tackiness when molded or rolled.

Another object of the present invention is to provide a thermoplastic polyurethane resin composition suitable for practical use, for example, in excretion-treating materials such as a paper diaper.

The above objects are accomplished by the following composition; thermoplastic polyurethane resin composition comprising a thermoplastic polyurethane resin (A), and a modified polyolefin resin (B) as its components.

DETAILED DESCRIPTION OF THE INVENTION

The above-cited component which is the thermoplastic polyurethane resins applied to this invention preferably has a hardness (Shore A ) of from 80° to 100°, more preferably from 85° to 95° at 25° C., a tensile strength of 200 kg/cm² or more, more preferably from 300 to 500 kg/cm², and fracture elongation of 300% or more, more preferably 400% or more.

The thermoplastic polyurethane resin which can be used in this invention is preferably a reaction product of a polyhydroxyl compound (polyol component) and a polyisocyanate compound (isocyanate component).

Polyhydroxyl compounds are, for example, various polyester polyols and/or polyether polyols which are generally used for the preparation of urethane compounds.

Polyester polyols described herein are the condensation products of polyvalent alcohol and polybasic carboxylic acid, hydroxycarboxylic acid and polyhydric alcohol, poly-hydric alcohols used herein are, for example, ethylene glycol, propylene glycol, butanediol, diethylene glycol, glycerol, hexanetriol, trimethylolpropane.

Polybasic carboxylic acids used herein are, for example, adipic acid, glutaric acid, azelaic acid, fumaric acid, maleic acid, phthalic acid, terephthalic acid, dimeric acid, pyromellitic acid.

Condensation products of a hydroxycarboxylic acid and a polyvalent alcohol are, for example, castor oil, reaction products of castor oil and ethylene glycol, or castor oil and propylene glycol.

Moreover, polyesterpolyols which are obtained by the ring-opening polymerization of various lactones such as ε-caprolactone are preferably used in this invention.

These 'lactone-type' polyester polyols can be also used in this invention which addition-polymerize a polyhydric alcohol and one or more lactones such as ε-caprolactone, δ-valerolactone, and β-methyl-δ-valerolactone.

Polyether polyols used in this invention are, for example, addition polymerization products of one or more compounds such as ethylene oxide, propylene oxide, alkylene oxide butylene oxide, and tetrahydrofuran, and compounds having two or more active hydrogen atoms, which are generally used for the preparation of well-known polyurethane resins.

The above-cited compounds having two or more active hydrogen atoms are, for example, polyvalent alcohols, polybasic carboxylic acid, amines such as ethylenediamine, hexamethylenediamine, alkanolamines such as ethanolamine, propanolamine, polyvalent phenols such as resorcin, bisphenol, and castor oil.

Polyhydroxyl compounds used in this invention are one or more polyester polyols or polyether polyols.

Moreover, low molecular polyhydroxy compounds such as polyvalent alcohols described above can also be used as chain-extending agents together with above-cited polyester polyols and polyether polyols.

Polyisocyanate compounds used in this invention are those compounds which have two or more isocyanate groups per molecule, and in general are also used for the preparation of well-known type polyurethane resins. These are, for example, aromatic polyisocyanate compounds such as tolylene diisocyanate, diphenylmethane diisocyanate, dianisidyne diisocyanate, naphthalene diisocyanate, triphenylmethane triisocyanate, bis(-diisocyanatotolyl)phenylmethane, polymethylene polyphenyl polyisocyanate, aliphatic or alicyclic polyisocyanate compounds such as isophorone diisocyanate, dicyclohexylmethane diisocyanate (hydrogenated diphenylmethane diisocyanate), hexamethylene diisocyanate, xylylene diisocyanate, hydrogenated tolylene diisocyanate, isopropylidene bis(cyclohexyl isocyanate).

In the present invention, two or more kinds of the polyisocyanate compounds can be used.

Especially, it is preferable to use aliphatic or alicyclic polyisocyanates together with aromatic polyisocyanate compounds.

As the polyol components of the polyurethane resin, all the polyhydroxy compounds described above can be used which are applied to the preparation of urethane polymer containing isocyanate groups. That is to say, one or more kinds of polyester polyols or polyetherpolyols described above can be used. Moreover, low molecular polyhydroxy compounds such as the above-cited polyvalent alcohols are also used together.

The component which is the modified polyolefin resins (B) applied to this invention includes those polyolefin resins which are modified by acids or epoxy compounds.

They are preferably olefin copolymers containing carboxyl group and/or olefin copolymers containing epoxy group.

The above-cited component (B) is preferably used in amounts of from 1 to 50 parts by weight. On the other hand, component (A) is used in amounts of from 99 to 50 parts by weight in the composition of the thermoplastic polyurethane resin obtained in this invention. More preferably, (A)/(B) in weight ratio is (98 to 60)/(2 to 40).

The olefin copolymer containing carboxyl group should comprise 1-olefin, for example, ethylene, propylene, butane-1, isobutene, pentene-1, hexene-1, decene-1,4-methylbutene-1, 4-methylpentene-1, 4,4-dimethylpentene-1, vinylcyclo-hexane, styrene, α-methylstyrene, styrene substituted by a secondary alkyl group or its similar compound, in amounts of at least 50 mole %, preferably at least 70 mole %.

The mixture of these two or more compounds can also be used.

Among these compounds, a copolymer of ethylene and butene-1 or propylene is most preferred. Examples of its commercially available products include a series of 'TAFMER A' (ethylene-butene-1 copolymer, manufactured by Mitsui Petrochemical Industries, Ltd.) such as 'TAFMER-A4085', 'TAFMER A4090, TAFMER-A20090', and a series of 'TAFMER-P' (ethylene-propylene copolymer, manufactured by Mitsui Petrochemical Industries, Ltd.) such as 'TAFMER P-0280', 'TAFMER P0480', 'TAFMER-P0680', 'TAFMER P0880'.

Olefin copolymers containing carboxyl group described above are prepared by the methods of polymerization, such as the direct copolymerization of α, β-unsaturated carboxylic acid comonomers and the above-cited olefins, the graft copolymerization of the above-cited comonomers grafted onto polyolefins, or polyolefin copolymers, and so on.

As the acid components used herein, many acids are available. Examples thereof include acrylic acid, methacrylic acid, itaconic acid, maleic acid (anhydride), fumaric acid, and monoesters of the above-cited carboxylic acids. Among these compounds, acrylic acid, methacrylic acid, and maleic acid (anhydride) are preferably used. More preferably, maleic acid (anhydride) is used, because of its sufficient acid-modification effect, even if small amounts of them are added in comparison with the amounts of others.

As the preferable olefin copolymers containing carboxyl group, there are cited, for example, ethylenebutene-1-maleic acid (anhydride) copolymer, ethylenepropylene-maleic acid (anhydride) copolymer.

Olefin copolymers containing epoxy group are prepared by the methods such as direct copolymerization of glycidyl esters of α,β-unsaturated carboxylic acids as epoxy compounds are the above-cited olefins, graft copolymerization of the above cited esters grafted onto polyolefin or polyolefin copolymers.

Glycidyl esters used herein have the general formula shown below:

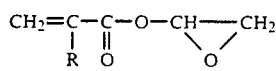

In the above formula, R represents a hydrogen atom, or a lower alkyl group.

The above-cited esters or mixtures of two or more kinds of esters can be used in this invention For example, glycidyl acrylate, glycidyl methacrylate, glycidyl ethacrylate. Among these esters, glycidyl methacrylate is preferably used.

Such polyolefin resins modified by the carboxyl and/or epoxy groups contain monomers having the above-cited functional groups in an amounts of from 0.01 to 20 weight %, preferably from 0.05 to 5 weight % as these components.

The small amounts of various kinds of agents can be added to the thermoplastic polyurethane resin obtained in this invention, for example, mold releasing agents, coupling agents, coloring agents, lubricant, weather stabilizers, foaming agents, rust preventives, emulsifier, mold preventives, fillers. Especially, in this invention, it is important in view of preventing tackiness to add the fillers. As fillers used here, there are, for example, calcium carbonate, clay, alumina powder, natural silica powder, talc, barium sulfate, silica powder, mica, glass powder. Among these fillers, calcium carbonate is preferably used.

The thermoplastic polyurethane resin obtained in this invention has a good flexibility, and gives smooth touch. Therefore, it can be applied in the form of films, sheets, or moldings, preferably films or sheets to the things which are brought in contact with the skin of a human body.

Especially, it is available for stretching films which often come into contact with a human body, for example, the waist and the crotch parts of excretion-treating materials such as a paper diaper.

The thickness of the above-cited films preferably is from 10 to 200 μm, and the thickness of the sheets preferably is more than 200 μm.

These films or sheets are prepared by the general methods such as extrusion, T die, or inflation.

To the resin obtained in this invention, other thermoplastic resins or elastomers can be added within the scope of the objects of this invention. For example, there can be used polyvinyl chloride, ethylene-vinyl acetate copolymer, polyester copolymer, styrene-type elastomer, polybutadiene, vinyl chloride-type elastomer, acryl-type polymer, polyamide, polyimide, polyamideimide, or polyphenylene sulfide.

The thermoplastic polyurethane resin composition obtained in this invention can be prepared by the various well-known methods For example, after blending raw materials homogeneously in a mixing machine such as tumbler or Henschel mixer, the resulting mixture of the above-cited raw materials is supplied to a uniaxial or biaxial extruder, melted and kneaded to prepare it in the form of pellets.

The larger the amounts of the modified olefin resins (B) added to the resin of this invention, the more improved their flexibility, smooth touch, and pliability, but the more decreased in heat-stability and permanent set. Thus, the amount of the above-cited component (B) to be added should be determined according to the purpose for which the resin composition of this invention is to be applied. When the amount of component (B) is less than 1 part by weight, the effects of this invention is hardly obtainable.

Because the modified polyolefin resins (B) having good compatibility with the polyurethane resins (A) are blended therewith, the polyurethane resin composition of this invention still holds an excellent tensile strength, fracture elongation, cold resistance, and wear resistance, which are the specific properties of polyurethane resin. Moreover, the thermoplastic polyurethane resin composition of this invention acquires excellent flexibility, pliability, feeling or smooth touch, and non tackiness when molding or rolling the films made of the resin.

The films obtained from the polyurethane resin of this invention are quite suitable for the elastic films for waist-gathering or leg-gathering of the paper diaper.

This invention will be described in greater detail with reference to the following examples. But, this invention is not limited thereto. In the examples, all parts are by weight.

REFERENCE EXAMPLE 1

Preparation of Olefin Copolymer Containing Carboxyl Group

Hundred (100) parts of ethylene-butene-1 copolymer (the above-cited TAFMER-A4090), 0.5 part of 1,3-bis (tert.-butyl peroxypropyl) benzene, and 1 part of maleic anhydride were mixed homogeneously. Next, the mixture was kneaded, and pelletized by an extruder at a cylinder temperature of 220° C. Thus, olefin copolymer containing carboxyl group was obtained.

This olefin copolymer was confirmed to contain 0.75 part of grafted maleic acid anhydride per 100 parts of ethylene-butene-1 copolymer according to the infrared spectrometry. This was named copolymer (I).

parts of ethylene-butene-1 copolymer, according to the measurement of the amounts of grafted methacrylic acid glycidyl ether. This was named copolymer (II).

EXAMPLES 1 to 7

The mixture was kneaded and pelletized with a 50 m/m extruder at 190° to 200° C., which was mixed with thermoplastic polyurethane resins (PANDEX T-5167, and PANDEX T-6090, manufactured by Dainippon Ink and Chemicals, Inc.), the above-cited copolymers (I) and (II), small amounts of calcium carbonate as a filler, and aliphatic acid amide as a lubricant in proportions shown in Table 1.

The test pieces in the form of films (thickness; 30 to 40 μm) were obtained from the above-cited pellets by an inflation-type extruder (65 m/m). The test results obtained are shown in Table 1.

COMPARATIVE EXAMPLES 1 to 3

Similar evaluation to the preparation of above-cited Examples, the mixed product of thermoplastic polyurethane resins (PANDEX T-5167, manufactured by Dainippon Ink and Chemicals, Inc.), and SBR resins (T-R2000 manufactured by Japan Synthetic Rubber Co. Ltd.) was obtained. This product and each of the above-cited single polymer were pelletized, filmed, and tested with the same procedure as in the above-cited Examples. The results obtained are also shown in Table 1.

TABLE 1

| Material/Property | Ex.1 | Ex.2 | Ex.3 | Ex.4 | Ex.5 | Ex.6 | Ex.7 | C.Ex.1 | C.Ex.2 | C.Ex.3 |
|---|---|---|---|---|---|---|---|---|---|---|
| PANDEX T-5167 Urethane | 99 | 80 | 50 | 80 | | | | 80 | 100 | |
| PANDEX T-6090 Urethane | | | | | 80 | 50 | 80 | | | |
| T-R2000 SBR | | | | | | | | 10 | | 100 |
| Copolymer I Modified Olefin | 1 | 20 | 50 | | 20 | 50 | | | | |
| Copolymer II Modified Olefin | | | | 20 | | | 20 | | | |
| Calcium carbide Filler | 10 | 5 | 5 | 5 | 5 | 0 | 5 | 10 | 5 | 5 |
| Aliphatic acid Lubricant amide | 0.3 | 0.3 | 0.3 | 0.3 | 0.3 | 0.3 | 0.3 | 0.3 | 0.3 | 0.3 |
| 50% Modulus (Kg/cm$^2$) | 40 | 45 | 33 | 47 | 40 | 30 | 45 | 70 | 65 | 55 |
| Tensile strength (kg/cm$^2$) | 400 | 450 | 235 | 440 | 390 | 225 | 380 | 350 | 500 | 220 |
| Fracture elongation (%) | 400 | 450 | 510 | 460 | 470 | 570 | 465 | 300 | 390 | 380 |
| Permanent set (%) | 7 | 4 | 7 | 4 | 3 | 6 | 3 | 9 | 5 | 10 |
| Film forming property[1] | B | A | B | A | A | B | A | B | C | B |
| Pin hole[2] | C | B | B | B | B | C | B | C | C | B |
| Foaming[2] | C | B | B | B | B | B | B | C | B | B |
| Tackiness[2] | B | A | B | A | A | C | A | B | D | D |
| Flexibility of film[1] | B | A | B | A | A | C | A | C | B | D |
| Stretching property of film[1] | B | A | C | A | A | C | A | C | B | D |
| Feeling of film (smooth touch)[1] | C | A | B | A | A | B | A | D | D | D |
| Frill formation in film (smooth touch)[2] | C | A | C | A | A | C | A | D | D | D |

*[1]The standard of evaluation: A - excellent, B - good, C - slightly bad, D - bad.
*[2]The standard of evaluation: A - none, B - few, C - a few, D - many
Flexibility of the films: The softness of the films were evaluated when rolling the film.
Smooth touch of the film: The feeling when touching the film was evaluated.
Frill of the film: The degree of frill remained after clenching the film was evaluated.

REFERENCE EXAMPLE 2

Preparation of Olefin Copolymer Containing Epoxy Group

Hundred (100) parts of ethylene-butene-1 copolymer (above-cited TAFMER-A4090), 0.5 part of dicumyl peroxide and 2 parts of methacrylic acid glycidyl ether were homogeneously mixed. Next, the mixture was kneaded, and pelletized by a biaxial extruder at a cylinder temperature of 200° C. Thus, olefin copolymer containing epoxy group was obtained.

This olefin copolymer was confirmed to contain 1.25 parts of grafted methacrylic acid glycidyl ether per 100

What is claimed is:

1. A diaper comprising at least one sheet or film comprising a thermoplastic polyurethane resin composition comprising from 80 to 99 parts by weight of a thermoplastic polyurethane resin (A), and from 1 to 20 parts by weight of a chemically modified polyolefin resin (B) which contains a copolymer of ethylene and butene-1 or propylene, said copolymer additionally comprising carboxyl and/or epoxy groups, and (C) calcium carbonate.

2. The diaper as claimed in claim 1, wherein said thermoplastic polyurethane resin (A) has its properties which are Shore A hardness of from 80 to 100, tensile strength of 200 kg/cm² or more, and fracture elongation of 300% or more.

3. The diaper as claimed in claim 1, wherein said modified polyolefin resin (B) contains a modified ethylene-propylene copolymer.

4. In a diaper in which at least one film or sheet contacts the skin of a wearer, the improvement comprising a thermoplastic polyurethane resin composition comprising from 80 to 99 parts by weight of a thermoplastic polyurethane resin (A), from 1 to 20 parts by weight of a chemically modified polyolefin resin (b) which contains a copolymer of ethylene and butene-1 or propylene, said copolymer additionally comprising carboxyl and/or epoxy groups, and (C) calcium carbonate which is included in the film or sheet which contacts the skin of the wearer.

* * * * *